United States Patent
Claessen

(10) Patent No.: US 6,919,024 B1
(45) Date of Patent: Jul. 19, 2005

(54) PRESS MEMBRANE FROM A RUBBER-ELASTIC MATERIAL

(75) Inventor: Wilhelm Claessen, Aachen (DE)

(73) Assignee: Outokumpu Oyj, Espoo (FI)

( * ) Notice: Subject to any disclaimer, the term of this patent is extended or adjusted under 35 U.S.C. 154(b) by 19 days.

(21) Appl. No.: 10/130,957

(22) PCT Filed: Nov. 8, 2000

(86) PCT No.: PCT/EP00/11013

§ 371 (c)(1),
(2), (4) Date: May 22, 2002

(87) PCT Pub. No.: WO01/37962

PCT Pub. Date: May 31, 2001

(30) Foreign Application Priority Data

Nov. 25, 1999 (DE) ......................... 199 56 618

(51) Int. Cl.[7] .......................................... B01D 25/168
(52) U.S. Cl. .................. 210/229; 210/231; 210/350; 100/197; 100/211
(58) Field of Search .................. 210/227, 229, 210/350, 351, 231; 100/197, 211

(56) References Cited

U.S. PATENT DOCUMENTS 4,676,079 A * 6/1987 Czauderna .................. 68/242

FOREIGN PATENT DOCUMENTS

| DE | 4119166 | 12/1992 | |
|----|---------|---------|---|
| DE | 4408388 | 9/1995 | |
| EP | 0440205 | 8/1991 | |
| EP | 979680 A2 * | 2/2000 | ............ B05B/1/00 |
| GB | 2069358 | 8/1981 | |

* cited by examiner

*Primary Examiner*—Matthew O. Savage
(74) *Attorney, Agent, or Firm*—W. F. Fasse; W. G. Fasse

(57) ABSTRACT

The invention relates to a press membrane (9) for a filter plate (1') of a filter press. Said press membrane consists of a rubber-elastic material and is supported by the filter plate (1') while supporting a parallel filter cloth (14). An intermediate chamber defined between the press membrane (9) and the filter plate (1') can be impinged upon with a pressure medium. The aim of the invention is to prevent an overload of the membrane material in the area of the supporting cams (6) and damages of the filter cloth (14) in said areas. To this end, the press membrane (9) is provided with transmission disks (12) in the area of the supporting cams (6), said transmission disks (12) consisting of a substantially harder material than the rubber-elastic material of the remaining press membrane (9) and being vulcanized into the rubber-elastic material.

9 Claims, 2 Drawing Sheets

PRESS MEMBRANE FROM A RUBBER-ELASTIC MATERIAL

TITLE OF THE INVENTION

A press membrane from a rubber-elastic material

FIELD OF THE INVENTION

The invention relates to a press membrane made of a rubber-elastic material for a filter plate of a filter press, with the press membrane being supportable on the one hand by the filter plate and supporting on the other hand a parallel extending filter cloth by means of a plurality of knob-like elevations and with an intermediate space disposed between the press membrane and the filter plate being pressurizable with a pressure media, as a result of which the press membrane can be displaced in an elastic manner away from the filter plate and in the direction towards a filter. chamber which is delimited by the filter cloth in order to exert a pressing force on a filter cake building up in front of the filter cloth, and with pressure forces being transmittable by the press membrane in the zone of the supporting cams of the filter plate perpendicular to the same and to the press membrane per se, with the press membrane (9) being provided with transmission disks (12) in the area of the supporting cams (6), with said transmission disks (12) consisting of a substantially harder material then the rubber-elastic material of the remaining press membranes (9) and being vulcanized into the rubber-elastic material.

BACKGROUND INFORMATION

Such a press membrane is known from GB 2,069,358 A for example. In addition to inset elements in the form of reinforcing fabrics, transmission disks in the form of perforated steel disks are described in that British specification. Said steel disks are substantially thinner than the thickness of the press membrane. If a pressure load of the membrane occurs in the zone of the supporting cams, a flow of the rubber-elastic material occurs on either side of the transmission disk, thus leading to shearing stresses due to the shearing stresses at the surface of the virtually non-extensible transmission disks and thus to a shearing off of the rubber-elastic material. This often leads to a breakdown of the press membrane into several layers, as a result of which the progressing destruction of the press membrane is introduced. p EP 0 440 205 A1 discloses an alternative press membrane in which the transmission disks consist of two at first mutually separated half-disks which are moved towards the press membrane from opposite sides and are mutually connected there in the mounting position with the help of screws. The permanent connection of the transmission disks with the rubber-elastic membrane material is to occur by way of clamping between the two mutually joined half-disks. A disadvantage of this known membrane design is that in the case of a tensile load on the membrane within the disk plane (as occurs for example in the case of a pressurization of the filter chamber or the press water chamber), there is the likelihood that the rubber material clamped between the half-disks will partly slip out and thus the strength of the connection of the transmission disk will be lost. There is also the likelihood of damage to the rubber membrane in the zone of the comparably sharp-edged circumferential edges of the half-disk(s) projecting over the membrane surface.

A further press membrane is known from DE 41 19 166 C2. In order to seal the intermediate space which is pressurized with a pressure media, the pressure membrane engages with a circumferential shoulder in a circumferential groove which is adjusted thereto and is disposed in the frame of the filter plate. In the zone of the supporting cams of the filter plate the wall thickness of the press membrane is doubled in comparison with the other zones, with a fabric reinforcement being disposed in said enlarged zones within the rubber-elastic material. This fabric reinforcement is to be used to prevent deformations as will occur under such a high pressure load of the membrane in the zone of the supporting cams.

Since the rubber material as used for the press membrane principally concerns a substantially incompressible material, the high pressure load of the press membrane in the aforementioned zones leads to a virtual "flow" of the rubber material, whereas the fabric reinforcement is unable to follow such a flowing movement of the ambient rubber material. The consequence is a breakdown of the bond between the fabric reinforcement and the ambient rubber material, thus leading to a destruction of the press membrane in the form of fissuring in the rubber material at such places especially due to a multi-axial tension state.

Due to the flow movement of the rubber material there is a relative movement between the latter, the associated supporting cams of the filter plates and between the filter cloths disposed between the two aforementioned components. This leads to a high frictional wear on the rubber surface on the one hand and to an impermissibly large extension of the filter cloths on the other hand, which may result in the highly feared so-called cross-tears in the filter cloth fabric.

Another generally known press membrane is provided in the zone of the supporting cams with recesses, so that the supporting cams of opposite filter plates will rest on one another only via the two interposed filter cloths. Such a construction will not lead to any flowing of rubber material and fissuring in the same as well as to any overextension of the filter cloths caused by the flowing movement of the rubber material. A disadvantage of such a press membrane is that the membrane needs to be sealed in the zone of the recesses with respect to the filter plate in order to prevent any penetration of press water on the filtrate side. The measures required for such a reliable sealing are complex and will considerably drive up the price for a filter press based on such a principle.

SUMMARY OF THE INVENTION

The invention is based on the object of improving a press membrane in such a way that in the case of introducing a force via the supporting cams of a filter plate both a destruction of the press membrane itself as well as the filter cloth is prevented. Furthermore, the production costs for such a press membrane are to be low and additional sealing efforts should be excluded.

Based on a press membrane of the kind described above, this object is achieved in accordance with the invention in such a way that the transmission disks (12) form with their opposite face sides a part of the surfaces of the press membranes (9) and that the surfaces of the press membranes (9) extend in a continuous fashion in the transition zone from the transmission disks (12) to the other press membranes (9).

The harder material in the zone of the supporting cams prevents flowing even under large pressure loads, so that in the particularly stressed zones of the press membrane there can neither be any damage to the membrane per se, nor to the filter cloths which are also subjected to pressure load.

Since the press membrane consists merely in the zone of the transmission disks of a hard and thus hardly elastic material, the required elasticity is not limited in the remaining membrane zones, since rubber-elastic material is used there as in membranes according to the state of the art. In the zone of the supporting cams the loss of elasticity is not disadvantageous because displacement cannot occur anyway in these zones due to the clamping of the material.

The production process of the press membrane in accordance with the invention is particularly simple because the transmission disks are vulcanized into the rubber-elastic material. Moreover, this ensures a very reliable sealing between the transmission disks and the membrane material surrounding the same.

Since the transmission disks each form a part of the opposite surfaces of the press membranes, they rest directly on the supporting cams or filter cloths, so that in the power transmission zone there is no rubber-elastic material at all.

Since the surfaces of the press membrane extend continuously in the zone of the transmission disks, the likelihood of local excessive strains on the material such as by sharp edges for example is avoided.

It is provided in a further development of the invention that the transmission disks are circular and comprise a diameter which is slightly smaller than the diameter of the also circular supporting cams. It is ensured in this way that in all deformation states of the press membrane there are no discontinuous courses of the rubber-elastic material and, as a result of the same, there is no excessive strain on the same.

In view of the production costs, it is particularly advantageous when the transmission disks are made of a plastic material, preferably of polyamide or polypropylene.

It may also be appropriate as an alternative thereto and depending on the respective application to provide transmission disks of a metallic material which is preferably corrosion-proof. The corrosion resistance of the metal also allows in these cases to use aggressive suspensions in the filtration.

In order to exclude the extraction of the transmission disks from the press membrane even at higher loads, it is provided that there is a positive lock between the transmission disks and the ambient material. This positive lock can preferably be produced by at least one groove which is provided circumferentially in a face side of the transmission disks and is filled with rubber-elastic material during the production process of the press membrane.

The durability of the connection between the transmission disks and the ambient membrane material can be increased even further when the circumference of the transmission disks is provided with elevations and/or recesses (preferably in form of a circumferential toothing), since a positive lock is thus ensured.

BRIEF DESCRIPTION OF THE DRAWINGS

The invention is now explained in closer detail by reference to an embodiment of a press membrane which is shown in the drawings, wherein.

DETAILED DESCRIPTION OF A PREFERRED EXAMPLE EMBODIMENT AND OF THE BEST MODE OF THE INVENTION

Figure 1:
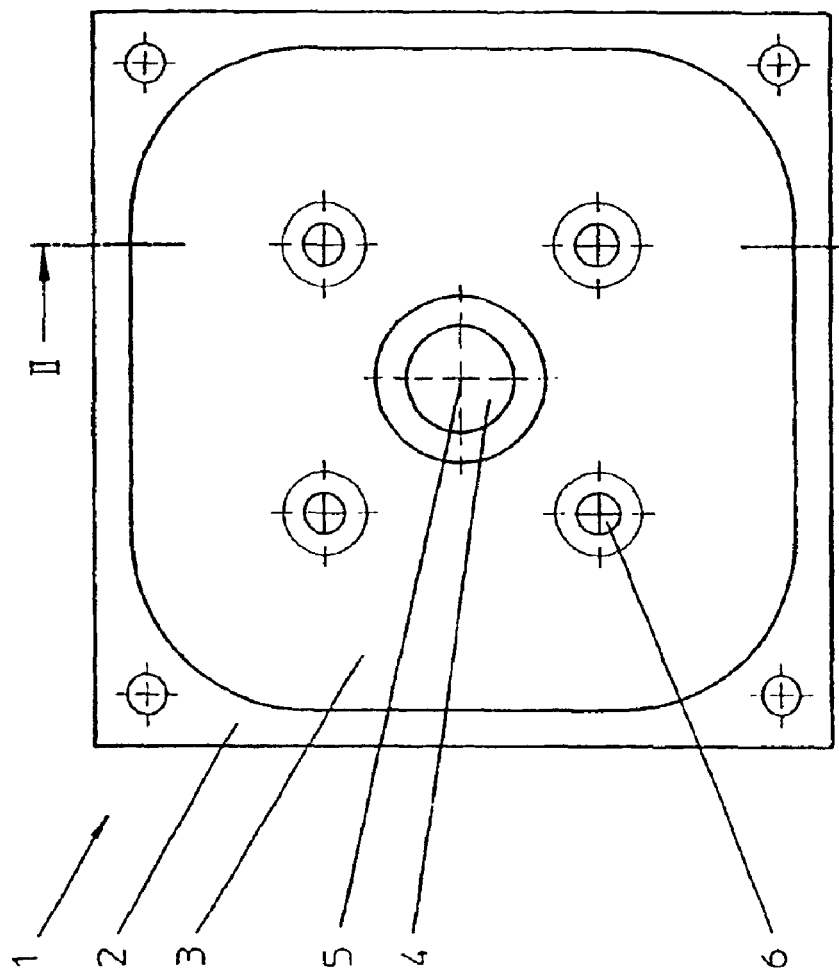
FIG. 1 shows a view of a filter plate with a central pulp inlet and four supporting cams.

FIG. 1 shows a view of a filter plate 1 of which a plurality thereof are disposed parallel with respect to one another in a filter press for the filtration of suspensions. Every filter plate 1 consists of a circumferential frame 2 and a plate face 3 which is enclosed by the same. At a central location of the plate face 3 there is a so-called central pulp inlet 4 which extends in the manner of a conduit through all successively arranged filter plates 1. Supporting cams 6 are disposed at the same distance about a longitudinal axis 5 of the pulp inlet 4, which supporting cams project from the plate face 3 which is disposed in a recessed manner with respect to the frame 2.

Figure 2:
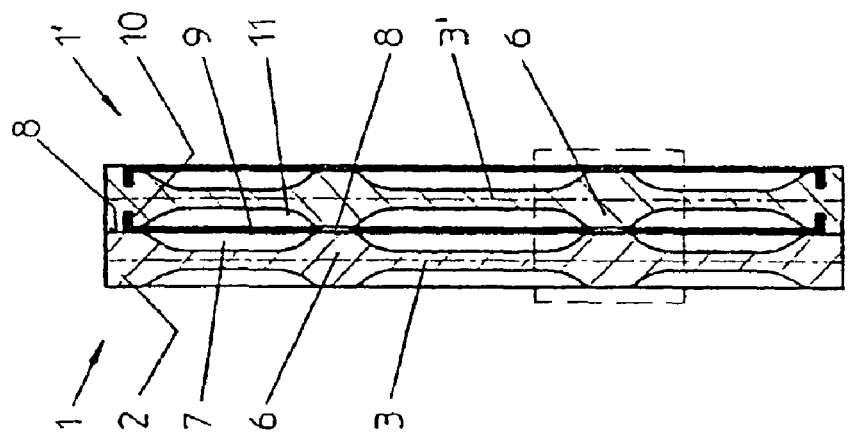
FIG. 2 shows a sectional view along the line II—II through the filter plate according to FIG. 1.

FIG. 2 shows that a filter chamber 7 is enclosed between two adjacent filter plates 1 and 1'. Said filter chamber is obtained in the compressed state of adjacent filter plates 1 and 1' in such a way that the plate face 3 is rearwardly offset with respect to a separating plane 8 between abutting frames 2.

With the exception of the zone of the circumferential frame 2, the opposite filter plates 1 and 1' merely touch one another in addition in the zone of the four supporting cams 6.

The filter plate 1', which is shown at the right-hand side in FIG. 2, is provided with a press membrane 9 which engages with the help of a sealing edge 10 extending in a circumferential manner around the edge in a matching groove in the frame 2 of the filter plate 1' and which ensures a sealing both of an intermediate space 11 as well as the filter chamber 7 in the compressed state of the stack of filter plates. The intermediate space 11 is disposed between the press membrane 9 and the plate face 3' of the filter plate 1'. Said intermediate space 11 can be pressurized with a pressure media, especially with press water.

In FIG. 2 the filter plate 1 is shown in a cross-sectional view as a chamber plate and the filter plate 1' as a membrane plate. As an alternative to this, every filter plate can be arranged at one side as a chamber plate and at the opposite side as a membrane plate. In a further variant membrane plates can be used exclusively.

Figure 3:
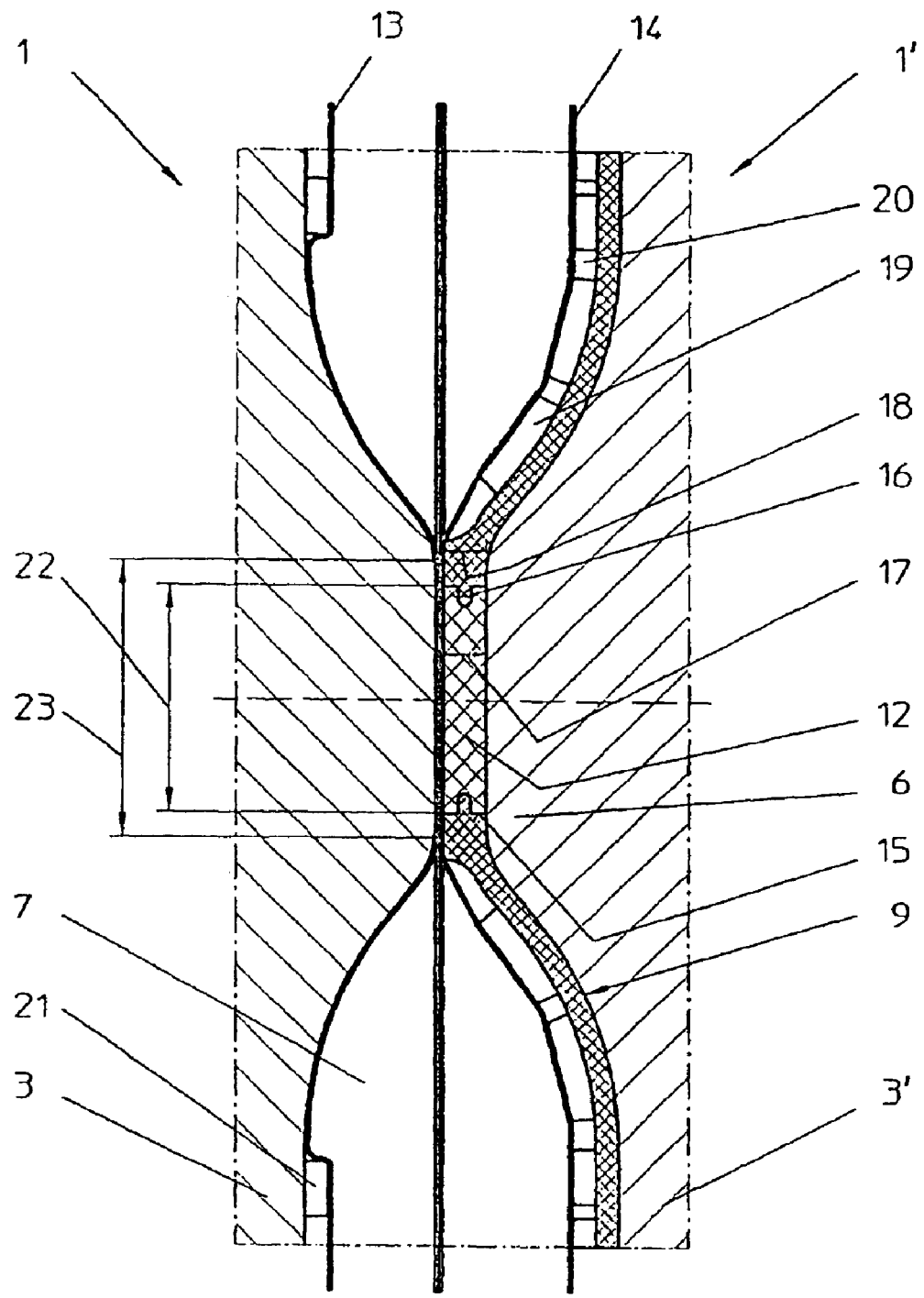
FIG. 3 shows an enlarged sectional view of FIG. 2 in the zone of the two supporting cams.

The enlarged view according to FIG. 3 shows that in the zone of two mutually opposite supporting cams 6 a transmission disk 12 is integrated in the press membrane 9, which transmission disk consists of a hard plastic material or a corrosion-proof metal. The power transmission between two mutually opposite supporting cams 6 is therefore performed via the transmission disk 12 as well as two filter cloths 13 and 14, and not via the rubber-elastic material of the remaining press membrane 9.

A power transmission between adjacent supporting cams 6 will always occur when there are different pressures in adjacent filter chambers 7. Such differential pressures can be produced in such a way that the feed cross sections are differently large or that, after a change of the filter cloth in the chamber, the flow resistance by such a filter cloth is comparably small, as a result of which the pressure build-up in the affected chamber is delayed. As a result of the large surface area of the plate face 3, considerable forces will occur already from comparably small differential pressures in the adjacent filter chambers 7 which without any mutual support of adjacent filter plates 1, 1' via the supporting cams 6 would lead to an impermissibly large deformation of the filter plates 1, 1' in the zone of the plate faces 3, 3'.

FIG. 3 shows further that the transmission disk 12 consist of a solid monolithic single piece of material and is provided with a U-shaped groove 16 which extends in a circumferential manner on its face side 15. The transmission disk 12 is vulcanized into the press membrane 9, with the rubber-elastic material completely filling the groove 16. Moreover, the circumference of the transmission disk 12 is provided with a circumferential toothing (not shown). The thickness 17 of the transmission disk 12 corresponds to the thickness 18 of the press membrane 9 in the adjacent zone, so that a continuous planar transition to the two surfaces of the press membranes 9 is obtained.

The press memberane 9 is provided at its supper side facing the filter cloth 14 with a plurality of regularly distributed cylinder-shaped knobs 19 which allow a discharge of the filtrate passing through the filter cloth 14 as a result of the clearance zones 20 interposed between said knobs.

Similarly, the plate face 3 of the filter plate 1 is provided with a plurality of knobs 21 which also allow an unhindered discharge of the filtrate.

Finally, FIG. 3 also shows that the diameter 22 of the transmission disks 12 is slightly smaller than the diameter 23 of the truncated supporting cams 6. This ensures that irrespective of the current deformation state of the rubber-elastic zones of the press membrane 9, a contact of the press membranes in the zones enclosing the transmission disks 12 is ensured which is free from any fissures or bends. After the completion of the filtration process and the optional washing process of the filter cake formed in the filter chamber 7, the press membrane 9 is deflected by pressurization from the side of the filter plate 1' to the left, with the filter cake being further compressed and further dewatered.

What is claimed is:

1. A press membrane (9) made of a rubber-elastic material in combination with a filter plate (1'), an adjacent plate (1) and a filter cloth of a filter press, with the press membrane (9) being supportable on one side thereof by the filter plate (1') and extending along and supporting on an other side thereof the filter cloth (14) by means of a plurality of knob-shaped elevations provided on the press membrane, and with an intermediate space (11) disposed between the press membrane (9) and the filter plate (1') being pressurizable with a pressure medium, as a result of which the press membrane (9) can be displaced in an elastic manner away from the filter plate (1') and in a direction toward a filter chamber (7) which is delimited between the filter cloth (14) and the adjacent plate (1) in order to exert a pressing force on a filter cake building up in front of the filter cloth (14), and with pressure forces being transmittable between the filter plate (1') and the adjacent plate (1) by the press membrane (9) clamped therebetween in an area of supporting cams (6) provided on the filter plate (1') and protruding perpendicular to the filter plate and to the press membrane (9) toward the adjacent plate (1), with the press membrane (9) being provided with imperforate transmission disks (12) in the area of the supporting cams (6), with said transmission disks (12) consisting of a substantially harder material than a rubber-elastic material of a remaining portion of the press membrane (9) and being vulcanized into the rubber-elastic material, characterized in that the transmission disks (12) form with their opposite face sides a part of surfaces of the press membrane (9) and that the surfaces of the press membrane (9) extend in a continuous planar manner in a transition region from the transmission disks (12) to the remaining portion of the press membrane (9).

2. A press membrane as claimed in claim 1, characterized in that the transmission disks (12) are circular and comprise a diameter (22) which is slightly smaller than a diameter of the supporting cams (6) which are circular.

3. A press membrane as claimed in claim 1, characterized in that the transmission disks (12) are made of a plastic material.

4. A press membrane as claimed in claim 3, wherein the plastic material is selected from the group consisting of polyamide and polypropylene.

5. A press membrane as claimed in claim 1, characterized in that the transmission disks (12) consist of a metallic material.

6. A press membrane as claimed in claim 5, wherein the metallic material is corrosion-proof.

7. A press membrane as claimed in claim 1, characterized in that each one of the transmission disks and the remaining portion of the press membrane respectively have interlocking shapes forming a positive lock at respective junctions between the transmission disks (12) and the remaining portion of the press membrane.

8. A press membrane as claimed in claim 7, characterized in that each one of the transmission disks (12) has at least one groove provided circumferentially in a circumferential surface of the transmission disk, wherein the groove is filled with the rubber-elastic material during production of the press membrane.

9. A press membrane as claimed in claim 1, wherein each said transmission disk (12) respectively consists of a solid monolithic single piece of said substantially harder material.

* * * * *

UNITED STATES PATENT AND TRADEMARK OFFICE
CERTIFICATE OF CORRECTION

PATENT NO. : 6,919,024 B1
DATED : July 19, 2005
INVENTOR(S) : Claessen

It is certified that error appears in the above-identified patent and that said Letters Patent is hereby corrected as shown below:

<u>Title page,</u>
Item [30], Foreign Application Priority Data, replace "199 56 618" by
-- 199 56 618.6 --.

<u>Column 1,</u>
Line 47, after "introduced" delete "p".
Line 47, before "EP 0 440 205 A1" begin new paragraph.

<u>Column 4,</u>
Line 62, after "disk 12" replace "consist" by -- consists --.

<u>Column 5,</u>
Line 6, before "9 is obtained" replace "membranes" by -- membrane --.
Line 7, before "side" replace "supper" by -- upper --.

Signed and Sealed this

Twenty-first Day of March, 2006

JON W. DUDAS
*Director of the United States Patent and Trademark Office*